Figure 1:
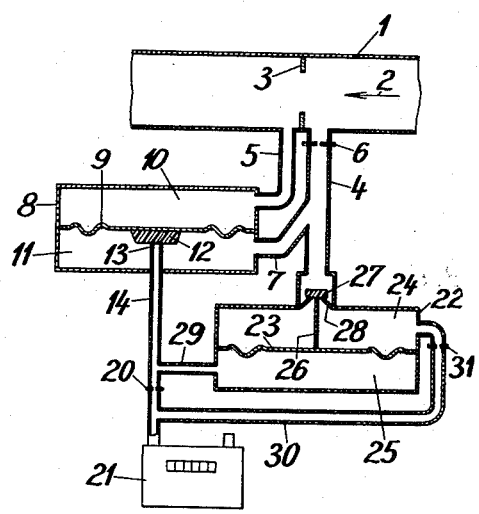

May 17, 1960   F. H. STIRNBERG   2,936,621
FLOW METER
Filed Oct. 10, 1957

Inventor:
Ferdinand Heinrich Stirnberg
By
Patent Agent.

United States Patent Office 2,936,621
Patented May 17, 1960

2,936,621
FLOW METER

Ferdinand Heinrich Stirnberg, Oberhausen, Germany, assignor to Dipl.-Ing. Gustav Karl Neuhaus, Essen-Stadtwald, Germany Application October 10, 1957, Serial No. 689,416

Claims priority, application Germany October 19, 1956

5 Claims. (Cl. 73—203)

The present invention relates to a flow meter, and, more specifically, to flow meters of the type which indirectly measure the quantity of fluid flowing through a main line by measuring a proportion of the fluid branched off therefrom.

It is an object of this invention to improve the precision of measurement of flow meters of the abovementioned type.

It is another object of this invention to provide a flow meter of the above-mentioned type which is highly reresponsive and accurate over the entire range of flow to be measured.

These and other objects and advantages of the invention will appear more clearly from the following specification in connection with the accompanying drawings diagrammatically illustrating a section through a flow meter according to the invention.

Referring now to the drawing in detail, the arrangement shown therein comprises a main line 1 through which the fluid to be measured flows in the direction of the arrow 2. Arranged within the main line 1 is an orifice plate or restrictor 3 creating an effective head. Ahead of the orifice plate, when looking in the direction of flow of the fluid in line 1, a branch conduit 4 branches off from the main line 1, while similarly behind the restrictor 3 a branch line 5 branches off from the main line 1. As will be evident from the drawing, an orifice plate or restrictor 6 is arranged in branch line 4 very close to the main line 1.

The branch line 5 leads to a flow divider housing 8 which is subdivided by means of a diaphragm 9 into two chambers 10 and 11. The chamber 10 communicates with the branch line 5. Whereas the chamber 11 communicates with the branch line 4 through branch line 7. Mounted on the diaphragm 9 and arranged in the chamber 11 is a valve body 12 cooperating with the valve seat 13 which is formed by one end of a conduit 14 leading from the chamber 11 to the gas meter 21. The conduit 14 has mounted therein a throttle or choke 20.

The device illustrated in the drawing furthermore comprises a flow divider like casing 22 which is sub-divided by means of a diaphragm 23 into two chambers 24 and 25. The diaphragm 23 has mounted thereon a rod-like member 26 carrying the valve body 27 cooperating with the valve seat 28. The valve body 27 is lifted off from the valve seat 28 when the pressure in chamber 25 exceeds the pressure in chamber 24. When the valve 27, 28 opens, the chamber 24 communicates with the branch line 4. Between the chamber 11 and the throttle or restriction 20, the conduit 14 communicates through conduit 29 with the chamber 25. Between the restriction 20 and the gas meter 21, the conduit 14 communicates through a conduit 30 with the chamber 24. The conduit 30 is provided with a choke or restriction 31. The total of the cross-sections of the throttles 20 and 31 is greater than that of the orifice plate or restrictor 6.

If the speed of flow of the fluid in line 1 is zero, both valves 12, 13 and 27, 28 are closed. If the speed of flow in line 1 is low, only valve 12, 13 opens so that a branch flow, henceforth called first branch flow, will pass through branch lines 4 and 7 into the chamber 11 and from there through conduit 14 into the gas meter 21. This condition prevails as long as the branch flow in conduit 14 remains so low that the pressure ahead of the restriction 20 will be substantially the same as the pressure behind the restriction 20. If, however, with increasing branch flow in conduit 14, an increased pressure builds up ahead of the throttle 20, this increased pressure is conveyed through conduit 29 to the chamber 25 and opens the valve 27, 28. As a result thereof, a second branch flow will pass through conduit 4 into the chamber 24 and from there through conduit 30 to the gas meter 21. Thus, when the valve 27, 28 opens, a condition of equilibrium will establish itself, at which a second branch flow flows to the gas meter 21 which corresponds to the pressure difference at the restriction 20, while at the throttle 31 the same pressure difference will prevail as at the throttle or restriction 20. The increased pressures ahead of the restrictions 20 and 31 may be employed for registering the momentary flow quantities by means of a root extracting writing instrument. Such registrations may be employed for comparatively checking the operation of the device.

As mentioned above, with the device shown in the drawing, a restriction 20 is arranged in the conduit 14 connected to the flow divider 8 to 13, while the pressure ahead of the said restriction 20 controls a flow controller 22 to 28 for that portion of the branch flow which does not flow through the flow divider 8 to 13. The subdivision of the branch flow exceeding a certain magnitude into two parts makes is possible to provide the valve 12, 13 with a relatively small cross-section. This has the advantage that already at very low flow speed, and thereby at very low difference in pressure in the chambers 10, 11, the valve 12, 13 will open and that the suction effect at the valve 12, 13 will remain very low. The suction effect at the valve 12, 13 will also be reduced by the pressure in conduit 14 and the pressure drop reduced thereby at the valve 12, 13. In this way, the measuring precision of the device will be greatly improved.

The arrangement of the orifice plate or restrictor 6 close to the main line 1 brings about that at said orifice plate there will prevail substantially the same temperature as at the restrictor 3 in the main line 1. This, likewise, contributes to the increase in the measuring precision of the device.

It is, of course, to be understood that the present invention is, by no means, limited to the particular construction shown in the drawing but also comprises any modifications within the scope of the appended claims. Thus, the restrictor 3 does not have to be an orifice plate but may also be a venturi pipe or the like.

What I claim is:

1. In combination in a flow meter in which the quantity of the flow to be measured is measured by measuring a proportional quantity of flow branched off therefrom: a main line for conveying the fluid the quantity of flow of which is to be measured; a main restrictor arranged in said main line; a flow divider proper comprising a casing and a diaphragm supported by said casing and sub-dividing the same into a first chamber and a second chamber; a first branch line branching off from said main line ahead of said main restrictor, when looking in the direction of flow in said main line, and communicating with said first chamber; a first auxiliary restrictor arranged in said first branch line; a second branch line leading from said main line behind said main restrictor to said second chamber; a valve seat member arranged in said casing and having an axial bore therethrough for discharging fluid from said first chamber; a valve member supported by said diaphragm for cooperation with said valve seat member to control the discharge of fluid from said first chamber into said bore; conduit means communicating with said bore and having an outlet for connection with a gas meter; a second auxiliary restrictor arranged in said conduit means and adapted to build up a pressure head therein; a fluid flow control device arranged between said first branch line behind said first auxiliary restrictor and said conduit means behind said second auxiliary restrictor; said fluid flow control device being adapted to communicate with said first branch line and including means for discharging fluid received from said first branch line to said conduit means behind said second auxiliary restrictor; said fluid flow control device also comprising regulating means responsive to the pressure head in said conduit means to regulate the flow through said fluid control device in conformity with said pressure head whereby the quantity of flow passing through said fluid flow control device increases with an increase in said pressure head and decreases with a decrease in said pressure head.

2. An arrangement according to claim 1, in which said first auxiliary restrictor in said first branch line is arranged close to said main line.

3. In combination in a flow meter in which the quantity of the flow to be measured is measured by measuring a proportional quantity of flow branched off therefrom: a main line for conveying the fluid the quantity of flow of which is to be measured; a main restrictor arranged in said main line; a flow divider proper comprising a casing and a diaphragm supported by said casing and sub-dividing the same into a first chamber and a second chamber; a first branch line branching off from said main line ahead of said main restrictor, when looking in the direction of flow in said main line, and communicating with said first chamber; a first auxiliary restrictor arranged in said first branch line; a second branch line leading from said main line behind said main restrictor to said second chamber; a valve seat member arranged in said casing and having an axial bore therethrough for discharging fluid from said first chamber; a first valve member supported by said diaphragm for cooperation with said valve seat member to control the discharge of fluid from said first chamber into said bore; first conduit means communicating with said bore and having an outlet for connection with a gas meter; a second auxiliary restrictor arranged in said first conduit means and adapted to build up a pressure head therein; a fluid flow control device comprising a second casing and a second diaphragm supported by said second casing and sub-dividing the same into a third chamber and a fourth chamber; second conduit means leading from said first branch line behind said first auxiliary restrictor to said third chamber; third conduit means leading from said third chamber to said first conduit means behind said second auxiliary restrictor; a second valve member connected to said second diaphragm for controlling communication between said second conduit means and said third chamber; and fourth conduit means leading from said first conduit means ahead of said second auxiliary restrictor to said fourth chamber whereby said second valve member will open in conformity with the increase of the pressure head built up in said first conduit means.

4. An arrangement according to claim 3, in which a third auxiliary restrictor is arranged in said third conduit means.

5. In combination in a flow meter in which the quantity of the flow to be measured is measured by measuring a proportional quantity of flow branched off therefrom: a main line for conveying the fluid the quantity of flow of which is to be measured; a main restrictor arranged in said main line; a flow divider proper comprising a casing and a diaphragm supported by said casing and sub-dividing the same into a first chamber and a second chamber; a first branch line branching off from said main line ahead of said main restrictor, when looking in the direction of flow in said main line, and communicating with said first chamber; a first auxiliary restrictor arranged in said first branch line; a second branch line leading from said main line behind said main restrictor to said second chamber; a valve seat member arranged in said casing and having an axial bore therethrough for discharging fluid from said first chamber; a first valve member supported by said diaphragm for cooperation with said valve seat member to control the discharge of fluid from said first chamber into said bore; first conduit means communicating with said bore and having an outlet for connection with a gas meter; a second auxiliary restrictor arranged in said first conduit means and adapted to build up a pressure head therein; a fluid flow control device comprising a second casing and a second diaphragm supported by said second casing and sub-dividing the same into a third chamber and a fourth chamber; second conduit means leading from said first branch line behind said first auxiliary restrictor to said third chamber; third conduit means leading from said third chamber to said first conduit means behind said second auxiliary restrictor; a second valve member connected to said second diaphragm for controlling communication between said second conduit means and said third chamber; fourth conduit means leading from said first conduit means ahead of said second auxiliary restrictor to said fourth chamber whereby said second valve member will open in conformity with the increase of the pressure head built up in said first conduit means against the pressure in said second conduit means; a third auxiliary restrictor in said third conduit means; the total of the cross sectional areas of the passages confined by said second and third auxiliary restrictors being in excess of the cross sectional area of the passage confined by said first auxiliary restrictor.

References Cited in the file of this patent

UNITED STATES PATENTS

| 475,596 | McDonald | May 24, 1892 |
| 2,044,806 | Naiman | June 23, 1936 |
| 2,621,515 | Meriam | Dec. 16, 1952 |

FOREIGN PATENTS

| 923,092 | Germany | Feb. 3, 1955 |